(12) United States Patent
Lefebvre et al.

(10) Patent No.: US 6,437,288 B1
(45) Date of Patent: Aug. 20, 2002

(54) PROCESS AND UNIT FOR THE MIG WELDING OF ALUMINUM AND ITS ALLOYS

(75) Inventors: Philippe Lefebvre, Saint Ouen L'Aumone; Laurent Biskup, Le Mesnil, both of (FR)

(73) Assignee: L'Air Liquide, Societe Anonyme A Directoire et Conseil de Surveillance pour l'Etude et l'Exploitation des procedes Georges Claude, Paris (FR)

(*) Notice: Subject to any disclaimer, the term of this patent is extended or adjusted under 35 U.S.C. 154(b) by 2 days.

(21) Appl. No.: 09/669,683

(22) Filed: Sep. 26, 2000

(30) Foreign Application Priority Data

Oct. 5, 1999 (FR) .............................. 99 12403

(51) Int. Cl.⁷ ............................................. B23K 9/173
(52) U.S. Cl. ................................. 219/137 WM; 219/74
(58) Field of Search .................. 219/74, 75, 137.42, 219/137.61, 137 WM, 137 R

(56) References Cited

U.S. PATENT DOCUMENTS 3,102,188 A * 8/1963 Wills ............................ 219/74
4,037,078 A * 7/1977 Oishi et al. ............. 219/137 R
5,081,334 A * 1/1992 Copher et al. ................ 219/74

FOREIGN PATENT DOCUMENTS

| EP | 0 544 187 | 6/1993 | |
| EP | 0 639 423 | 2/1995 | |
| EP | 0 799 666 | 10/1997 | |
| JP | 63-90368 | * 4/1988 | ................. 219/74 |

* cited by examiner

Primary Examiner—Clifford C. Shaw
(74) Attorney, Agent, or Firm—Young & Thompson

(57) ABSTRACT

The invention relates to a process and a unit for the MIG welding of aluminum and its alloys, employing gaseous shielding of the welded zone, composed of a central flow of gas consisting of argon and/or oxygen and of a peripheral gas stream consisting of argon or a mixture of argon and helium. The MIG welding process of the invention allows effective welding of workpieces made of aluminum or aluminum alloys by improving the penetration of the weld and the wetting of the weld bead, that is to say the angle of connection of the weld bead to the welded workpieces.

11 Claims, 3 Drawing Sheets

PROCESS AND UNIT FOR THE MIG WELDING OF ALUMINUM AND ITS ALLOYS

The present invention relates to a process and to a unit for the MIG welding of aluminum and its alloys with double gas shielding.

In electric arc welding, MIG (Metal Inert Gas) welding processes are widely used for welding various metallic materials, such as carbon steels, stainless steels, aluminum, nickel, copper, titanium, zirconium and alloys thereof.

During the actual MIG welding, an electric arc is generated between an electrode, namely a meltable wire, and the workpieces to be welded together, so as to melt said meltable wire by the heat generated by the electric arc and thereby form a welded joint between the workpieces to be welded.

The metal constituting the welded joint therefore comes essentially from the meltable wire and, in part, from the workpiece edges undergoing melting along their line of joining, that is to say the "molten metal" junction zone and the heat-affected zone lying on either side of this junction zone formed from "molten metal".

In order to avoid or minimize contamination of the welded joint being formed by atmospheric impurities liable to be present in the ambient air, it is common practice, in MIG welding, to shield all or part of the welded joint with a gas shield consisting of a gas or a gas mixture delivered by the welding torch used for implementing the process, that is to say for conveying and guiding the meltable welding wire coming from a reserve of wire or the like.

Thus, document U.S. Pat. No. 4,572,942 describes an arc welding process with meltable wire and gas shield, that is to say an MIG process, in which the gas shield is a quaternary mixture consisting of 40–70% argon, 25 to 60% helium, 3 to 10% carbon dioxide and 0.1 to 2% oxygen.

Furthermore, welding torches are also described in documents DE-A-2,143,466, U.S. Pat. No. 3,676,640, U.S. Pat. No. 3,155,811, U.S. Pat. No. 3,007,032 and U.S. Pat. No. 3,239,647.

Moreover, it has been demonstrated that improvements in the quality of the welded joint can be obtained by providing a double injection of shielding gas.

Thus, the document "Effect of a two-layer annular flow of shielding gases on the process of consumable electrode welding"; Welding International 1996, 10 (10), 813–815 describes a double-gas-shielded welding torch, that is to say a torch comprising a central nozzle delivering a stream of argon and a peripheral nozzle, based coaxially with respect to the central nozzle, supplying a stream of carbon dioxide. In this case, the meltable wire is guided by a sheath located inside the central nozzle, that is to say the stream of argon flows on the outside of the wire feed sheath.

Similarly, the document "Metal Transfer and Spatter Loss in Double Gas Shielded Metal Arc Welding"; Transactions of the Japan Welding Society, Vol. 19, No. 2, October 1988, pp 347–353 also describes a double-flow torch of this type used with the same gases.

However, although double gas injection does allow the quality of the weld to be improved it turns out that this technique considerably complicates the construction of the welding torch, given that it is necessary in this case for the torch to be provided with two concentric nozzles arranged coaxially around the feed sheath for the meltable welding wire constituting a consumable electrode.

In order to try to solve this problem of increased torch complexity, documents U.S. Pat. No. 4,731,518 and EP-A-480,837 teach the elimination of one of the two gas delivery nozzles and the introduction of the gas intended to form the central gas stream directly in the electrically conducting contact tube located at the end of the welding wire feed sheath, by introducing said gas either near and upstream of the torch, that is to say in the sheath, or much further upstream of the torch, that is to say at the upstream end of the wire feed sheath, or near it, or in the reserve of meltable wire, thereby allowing the wire in the entire wire feed sheath to be inserted.

In this case, the peripheral gas stream is normally delivered via a single delivery nozzle fitted around the wire feed sheath.

From these documents, any type of gas may be used, for example argon, carbon dioxide or helium, or mixtures of these gases with oxygen.

In the light of this prior art, the problem that arises is how to improve the known MIG welding processes so that aluminum or aluminum-alloy workpieces can be effectively welded by improving the penetration of the weld and the wetting of the weld bead, that is to say the angle of connection of the weld bead to the welded workpieces.

In other words, the present invention aims to further improve the quality of the welds obtained by an MIG process on aluminum and aluminum alloys.

The present invention therefore relates to an. MIG welding process for aluminum and aluminum alloys employing a welding torch comprising a torch body provided with a gas delivery nozzle and with a contact tube fitted into the torch body and emerging inside said delivery nozzle, said contact tube being electrically conducting and a metal consumable electrode passing through it, in which process:

a) a first gas stream is made to flow through said contact tube and a second gas stream is made to flow through said delivery nozzle, said first and second gas streams being directed toward the welding zone and constituting a gaseous shielding atmosphere shielding at least part of said welding zone, said second shielding gas stream being distributed approximately peripherally with respect to said first shielding gas stream so as to obtain two approximately concentric gas streams, b) at least one electric arc is created between said consumable electrode and said welding zone in order to melt part of said metal consumable electrode and to deposit, in the welding zone, at least some of said molten metal intended to form at least one welded joint, wherein the first gas stream consists of argon, oxygen or a mixture of argon and oxygen, and the second gas stream consists of argon or a mixture of argon and helium.

Depending on the case, the process of the invention may comprise one or more of the following characteristics:

the first gas stream consists of argon and the second gas stream consists of argon;

the first gas stream consists of oxygen and the second gas stream consists of argon or a mixture of argon and helium;

the first gas stream consists of a mixture of oxygen and argon and the second gas stream consists of argon or a mixture of argon and helium, the first gas stream consists of a mixture of oxygen and argon containing at most 5% oxygen;

the second gas stream consists of a binary mixture of argon and helium containing from 20 to 80% argon and the rest being helium;

the first gas stream consists of a binary mixture of argon and oxygen containing from 0.01 to 2% oxygen and the rest being argon, preferably the mixture contains less than 2% oxygen and the rest being argon;

the ratio of the flow rate of the first gas stream to the flow rate of the second gas stream is from 0.1/15 to 4/15, preferably from 0.03/15 to 0.5/15;

the consumable electrode is a meltable wire, preferably a solid wire;

the first gas stream is introduced into the consumable-electrode feed sheath at a site located immediately upstream of the torch body or at a site located near the upstream end of said electrode feed sheath.

Moreover, the invention also relates to an MIG welding unit capable of implementing a process according to the invention, comprising:

a welding torch comprising a torch body provided with a gas delivery nozzle and with a contact tube emerging in said delivery nozzle through which the contact tube passes a wire-shaped metal consumable electrode;

electric current supply means for supplying at least said torch with electric current;

at least one first source of a first gas consisting of argon, oxygen or a mixture of argon and oxygen;

at least one second source of a second gas consisting of argon or a mixture of argon and helium;

at least one supply of meltable wire constituting the consumable electrode;

wire feed means allowing the meltable wire to be guided between said supply of meltable wire and said torch body, said wire feed means comprising at least one sheath forming a sleeve around at least part of said wire and within which sheath said meltable wire is guided;

first gas conveying means for conveying the first gas stream between said first source of said first gas and a site located upstream of the torch body or near the upstream end of said sheath surrounding the wire;

second gas conveying means for conveying the first gas stream between said second source of said second gas and the gas delivery nozzle with which the torch body is equipped.

The invention will now be explained more clearly with the aid of examples and with reference to the appended figures, given by way of illustration but implying no limitation.

EXAMPLES

Figure 1A:
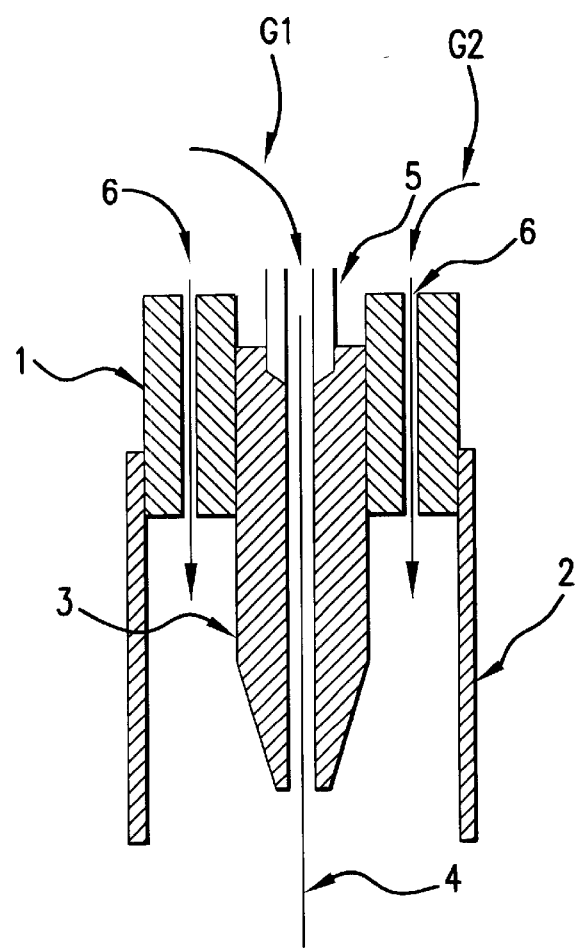
FIGS. 1a and 1b show a torch system used for the invention.
Figure 1B:
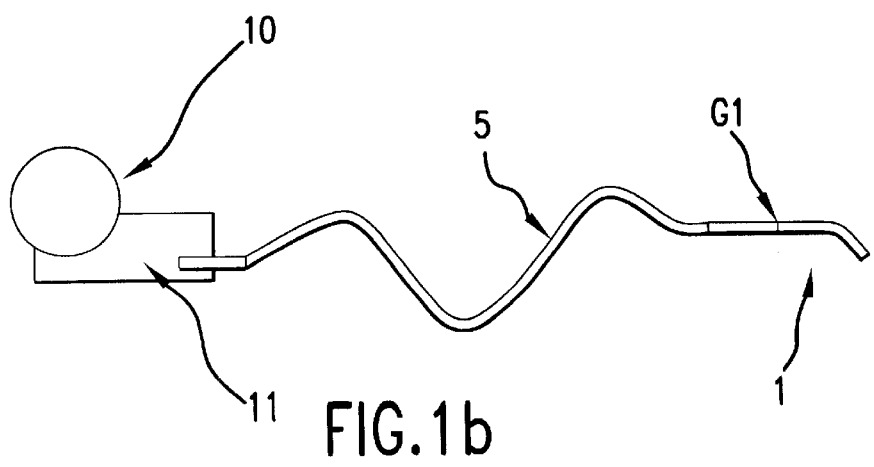

The examples below were produced with an MIG welding torch, as shown schematically in FIGS. 1a and 1b, which comprises a torch body 1 provided with a gas delivery nozzle 2, inside which an electrically conducting contact tube 3 emerges.

Passing through the contact tube 3 is a consumable electrode 4, that is to say a solid meltable wire, glided as far as the torch 1 inside a wire feed sheath 5, the upstream end of which is connected to a device 11 for feeding a meltable wire stored on a spool 10 of welding wire and the downstream end of which emerges in the contact tube 4, that is to say at the end upstream from said contact tube 4 of the torch 1.

In order to validate the process according to the invention, trials were carried out by introducing a shielding gas (G2) only into the nozzle 2 via the orifices and passages 6 or, by way of comparison, both into the nozzle 2 via said orifices and passages 6 and into the sheath 5 and therefore the contact tube 4 (with G1).

The details of these trials and the results obtained, in butt and downhand welding of aluminum (grade 5086) workpieces 6 mm in thickness, are given in the following table.

It should be noted that the torch used for these trials is a welding torch sold by the company LA SOUDURE AUTOGENE FRANCAISE under the commercial reference TM 700, which is fitted with a 28 mm nozzle ensuring effective gas shielding.

Furthermore, the consumable electrode is a solid meltable wire 1.2 mm in diameter sold by the same company under the commercial reference NERTALIC 30.

TABLE

| Trial | Gas in the nozzle | Gas in the sheath and contact tube | Increase in penetration | Bead quality improvement |
|---|---|---|---|---|
| A | Argon | — | — | — |
| B | Argon | Argon | +30% | yes |
| C | Mixture of argon + 1.4% oxygen | — | +20% | yes |
| D | Argon | Oxygen + Argon (<5%) | 30 to 50% | yes |

Figure 2:
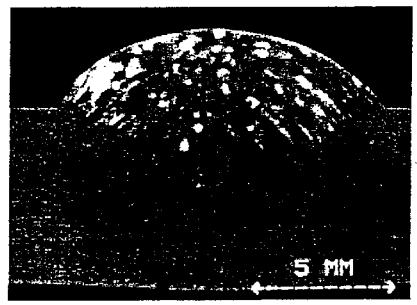
FIGS. 2 through 5, 6a, 6b, 7a, and 7bshow the results of various welding trials.
Figure 3:
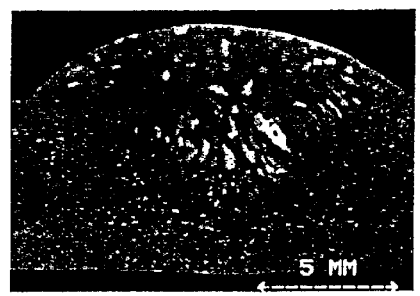

After comparing the results obtained, it may be seen that trial B according to the invention (see FIG. 3) results in an appreciable improvement in the morphology of the weld bead thus obtained, compared with trial A according to the prior art (see FIG. 2).

This is because trial B according to the invention makes it possible to achieve an increase in penetration of about 30% and better wetting of the bead, that is to say a more obtuse angle of connection between the bead and the workpieces thus welded.

Figure 4:
Figure 5:
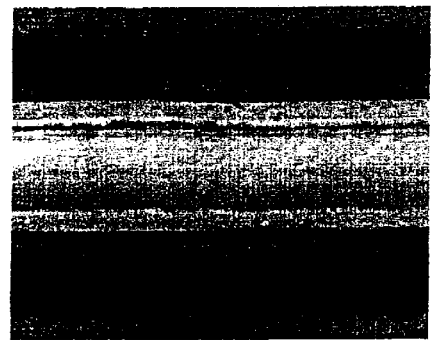

Furthermore, injecting a gas or gas mixture according to the invention makes it possible not only to increase the welding performance, particularly the penetration and wettability of the weld, but also to achieve a marked improvement in the quality of the bead, as shown in FIGS. 4 and 5.

FIG. 4 shows the weld bead (the as-welded appearance) obtained by joining the metal workpieces according to trial A, whereas FIG. 5 shows the weld bead obtained in trial B, that is to say according to the invention.

In both cases, the wire speed is about 13 m/min and the molten metal is sprayed more or less axially.

The observed improvements when implementing a process according to the invention may be the consequence of a more confined electric arc, and therefore one which is stiffer and better shielded, conducive to more substantial convection currents in the weld puddle and better wettability.

In fact, the appearance of the bead obtained in FIG. 4 corresponds to that conventionally obtained on alloys of the 5000 series. The presence of black spots on the bead is due to the volatilization of magnesium during the welding operation. Likewise, it will be noticed that the extent of a descaling zone varies depending on the equipment used and in particular the torch. As a general rule, it should be noted that welders judge the quality of their welds in the first instance based on the appearance of the bead and thereafter by an X-ray or other check, if necessary.

Moreover, trials C and D relate, on the one hand, to injection of a gas containing argon as a mixture with 1.4% oxygen according to the prior art (trial C) and, on the other hand, to injection of argon around the periphery and of argon as a mixture with oxygen (<5%) in the center, said argon/oxygen mixture being introduced into the wire feed sheath and delivered via the contact tube of the torch (trial D) in accordance with the invention.

Figure 6A:
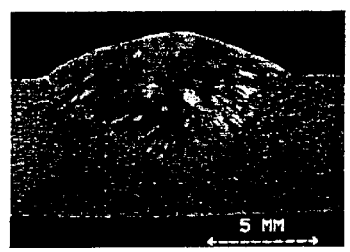
Figure 6B:
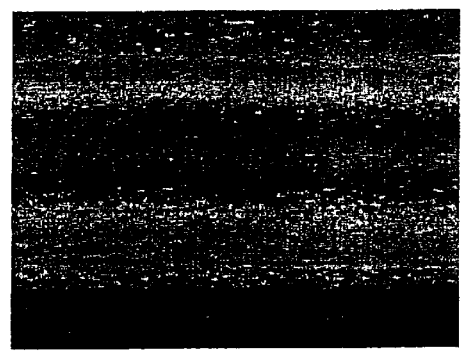
Figure 7A:
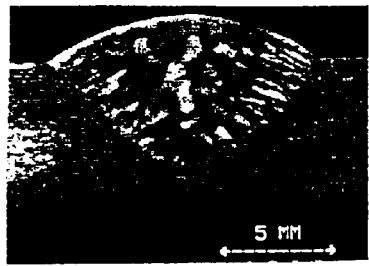
Figure 7B:
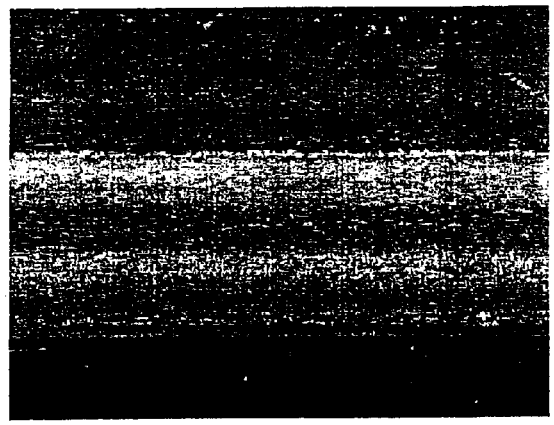

The results obtained are shown in FIGS. 6a and 6b (trial C) and 7a and 7b (trial D) and summarized in the above table.

As previously, it is found that by carrying out the process according to the invention (trial D), not only are the wettability and the penetration improved but also the appearance of the bead compared with an annular shielding gas formed from an argon/oxygen mixture (containing 1.4% oxygen) according to the prior art.

The present invention has, in addition, the advantage of being able to be employed both in manual MIG welding and in automatic or robotized MIG welding.

What is claimed is:

1. An MIG welding process for aluminum and aluminum alloys employing a welding torch comprising a torch body provided with a gas delivery nozzle and with a contact tube fitted into the torch body and emerging inside said delivery nozzle, said contact tube being electrically conducting and a metal consumable electrode passing through it, in which process:
    a) a first gas stream is made to flow through said contact tube and a second gas stream is made to flow through said delivery nozzle, said first and second gas streams being directed toward the welding zone and constituting a gaseous shielding atmosphere shielding at least part of said welding zone, said second shielding gas stream being distributed approximately peripherally with respect to said first shielding gas stream so as to obtain two approximately concentric gas streams,
    b) at least one electric arc is created between said consumable electrode and said welding zone in order to melt part of said metal consumable electrode and to deposit, in the welding zone, at least some of said molten metal intended to form at least one welded joint, wherein
        the first gas stream consists of oxygen and the second gas stream consists of argon or a mixture of argon and helium.

2. The process as claimed in claim 1, wherein the second gas stream consists of a mixture of argon and helium containing from 20 to 80% argon and the rest being helium.

3. The process as claimed in claim 1, wherein the ratio of the flow rate of the first gas stream to the flow rate of the second gas stream is from 0.01/15 to 4/15.

4. The process as claimed in claim 3, wherein said ratio is from 0.03/15 to 0.5/15.

5. The process as claimed in claim 1, wherein the consumable electrode is a meltable wire.

6. The process as claimed in claim 5, wherein said wire is a solid wire.

7. The process as claimed in claim 1, wherein the first gas stream is introduced into the consumable-electrode feed sheath at a site located immediately upstream of the torch body or at a site located near the upstream end of said electrode feed sheath.

8. An MIG welding process for aluminum and aluminum alloys employing a welding torch comprising a torch body provided with a gas delivery nozzle and with a contact tube fitted into the torch body and emerging inside said delivery nozzle, said contact tube being electrically conducting and a metal consumable electrode passing through it, in which process:
    a) a first gas stream is made to flow through said contact tube and a second gas stream is made to flow through said delivery nozzle, said first and second gas streams being directed toward the welding zone and constituting a gaseous shielding atmosphere shielding at least part of said welding zone, said second shielding gas stream being distributed approximately peripherally with respect to said first shielding gas stream so as to obtain two approximately concentric gas streams,
    b) at least one electric arc is created between said consumable electrode and said welding zone in order to melt part of said metal consumable electrode and to deposit, in the welding zone, at least some of said molten metal intended to form at least one welded joint, wherein
        the first gas stream consists of a mixture of oxygen and argon and the second gas stream consists of argon or a mixture of argon and helium.

9. The process as claimed in claim 8, wherein said first gas stream consists of a mixture of oxygen and argon containing at most 5% oxygen.

10. An MIG welding process for aluminum and aluminum alloys employing a welding torch comprising a torch body provided with a gas delivery nozzle and with a contact tube fitted into the torch body and emerging inside said delivery nozzle, said contact tube being electrically conducting and a metal consumable electrode passing through it, in which process:
    a) a first gas stream is made to flow through said contact tube and a second gas stream is made to flow through said delivery nozzle, said first and second gas streams being directed toward the welding zone and constituting a gaseous shielding atmosphere shielding at least part of said welding zone, said second shielding gas stream being distributed approximately peripherally with respect to said first shielding gas stream so as to obtain two approximately concentric gas streams,
    b) at least one electric arc is created between said consumable electrode and said welding zone in order to melt part of said metal consumable electrode and to deposit, in the welding zone, at least some of said molten metal intended to form at least one welded joint, wherein
        the second gas stream consists of argon or a mixture of argon and helium, and
        wherein the first gas stream consists of a mixture of argon and oxygen containing from 0.01 to 2% oxygen and the rest being argon.

11. The process as claimed in claim 10, wherein said mixture contains less than 2% oxygen and the rest being argon.

* * * * *